C. P. MADSEN.
ELECTRIC HEATER.
APPLICATION FILED SEPT. 23, 1908.
1,034,130.
Patented July 30, 1912.
4 SHEETS—SHEET 2.
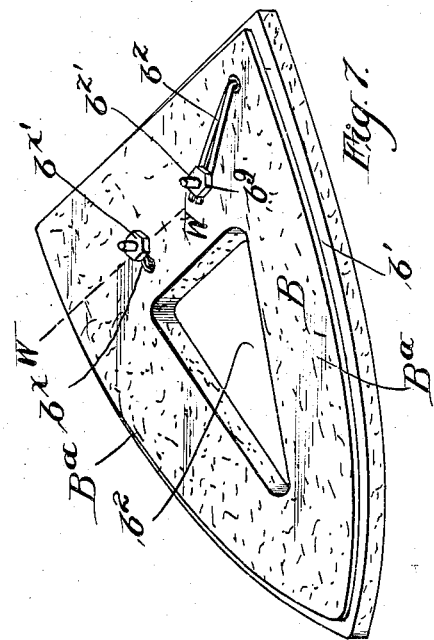
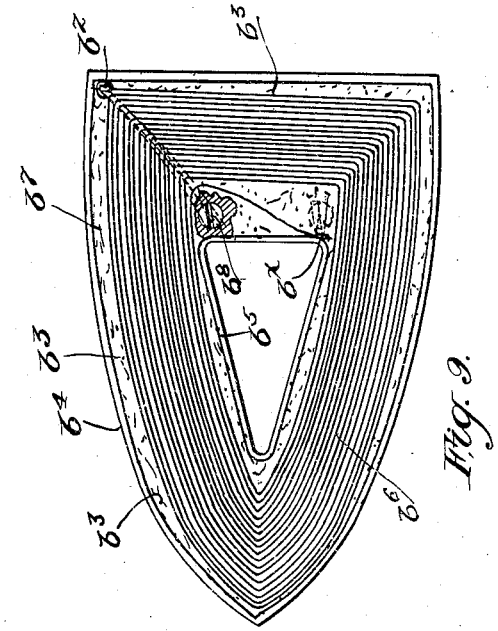
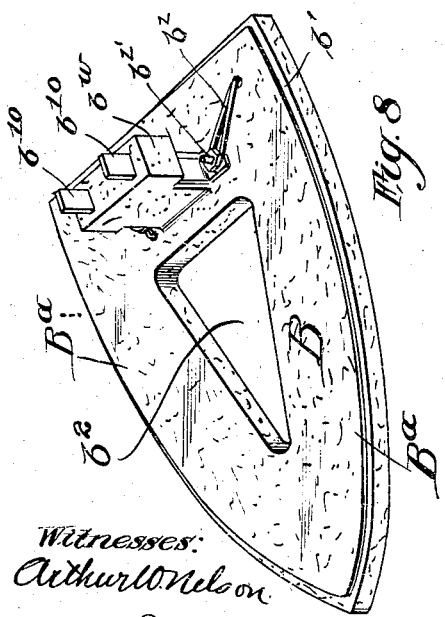
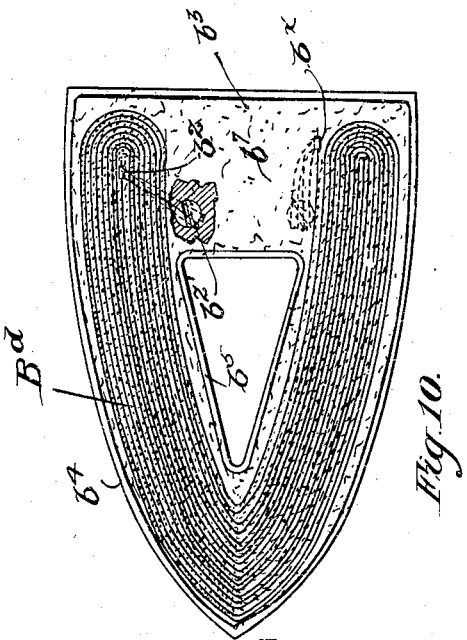
Witnesses:
Arthur O. Nelson
John R. Lepean
Inventor:
Charles P. Madsen
by
Atty.

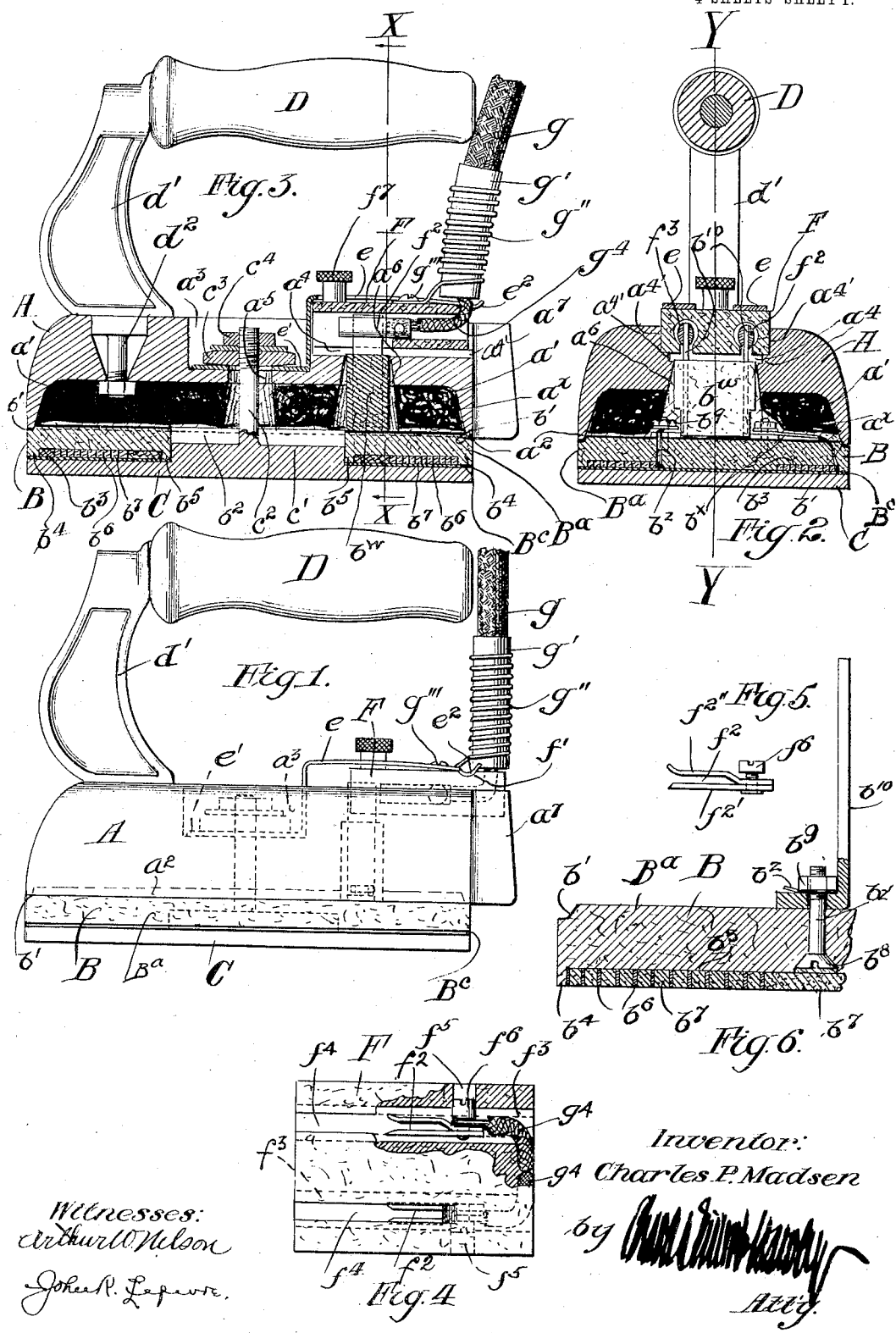

C. P. MADSEN.
ELECTRIC HEATER.
APPLICATION FILED SEPT. 23, 1908.
1,034,130.
Patented July 30, 1912.
4 SHEETS—SHEET 3.
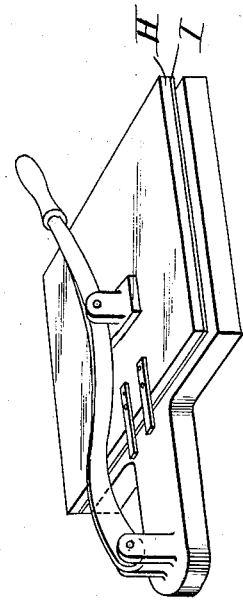
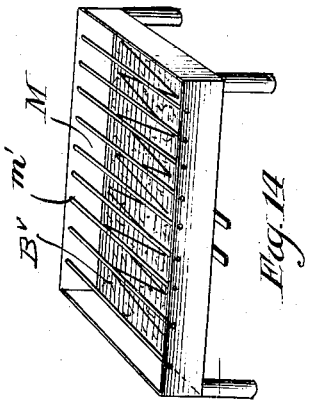
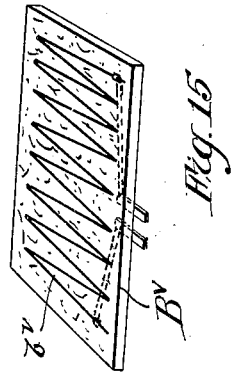
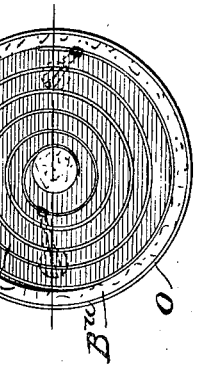
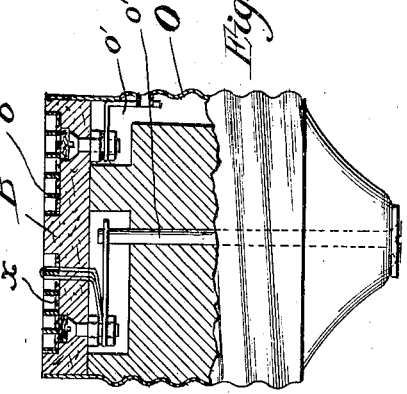
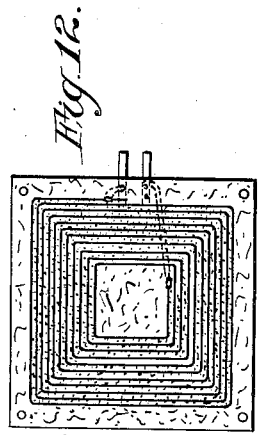
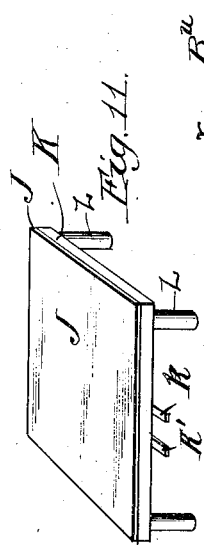
Witnesses:
Arthur O Nelson
John P Lepore
Inventor:
Charles P. Madsen
by
Atty.

C. P. MADSEN.
ELECTRIC HEATER.
APPLICATION FILED SEPT. 23, 1908.
1,034,130.
Patented July 30, 1912.
4 SHEETS—SHEET 4.
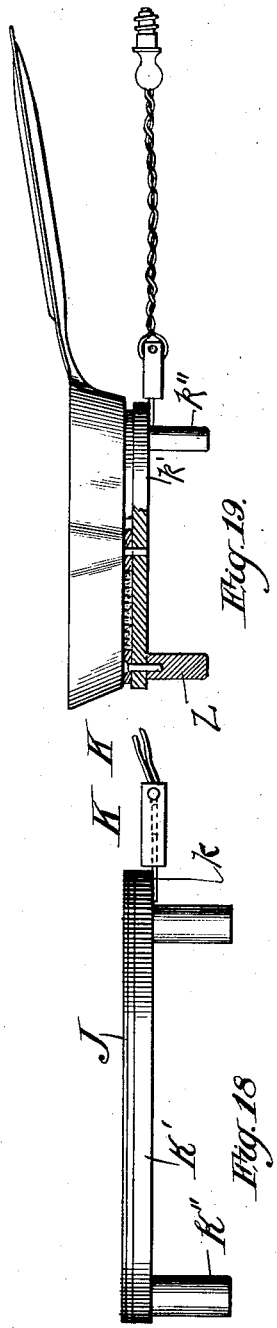
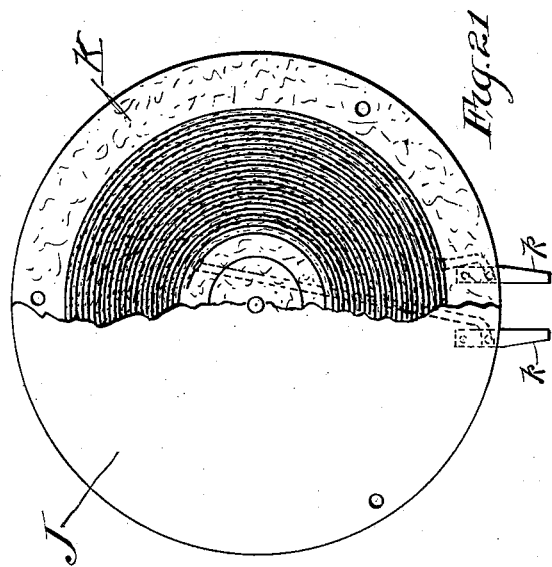
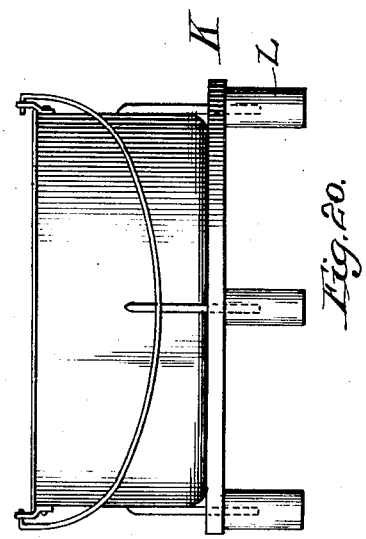
Witnesses:
Arthur W. Nelson
John P. Lefevre
Inventor:
Charles P. Madsen
by
Atty.

UNITED STATES PATENT OFFICE.

CHARLES P. MADSEN, OF CHICAGO, ILLINOIS, ASSIGNOR, BY MESNE ASSIGNMENTS, TO PELOUZE MANUFACTURING COMPANY, OF CHICAGO, ILLINOIS, A CORPORATION OF ILLINOIS.

ELECTRIC HEATER.

1,034,130.  Specification of Letters Patent.  Patented July 30, 1912.

Application filed September 23, 1908. Serial No. 454,355.

*To all whom it may concern:*

Be it known that I, CHARLES P. MADSEN, a citizen of the United States, and resident of Chicago, Illinois, have invented certain new and useful Improvements in Electric Heaters, of which the following is a full, true, clear, and exact description, such as will enable others skilled in the art to which it appertains to make and use the same.

My invention relates to improvements in electrically heated tools, implements and receptacles such as sad-irons, dentists' ovens, soldering irons, photograph mounters, cigar lighters, toasters, griddles and cooking utensils of various kinds.

The object of my invention is to improve electric heaters of these and other kinds which are capable of similar assemblage of parts; to improve the form and appearance of such devices; to form and construct the same in such manner that the electrical heating element or portion shall be independent of the other parts and capable of ready assemblage therewith or separation therefrom; to prevent accidents and shocks to the user; and, generally to increase the efficiency and durability of electrically heated tools and devices.

A special object of my invention is to improve the construction, efficiency, durability and handiness of electrical sadirons; and a further object of the invention is to produce a heating element for such devices, in the form of an independent, commercial article or articles of manufacture, varied in form or shape to fit it to tools, utensils and devices of different kinds.

I attain these objects in the manner hereinafter defined and by means of the structures clearly pointed out in the appended claims.

My invention will be more readily understood by reference to the accompanying drawings forming a part of this specification and in which:

Figure 1 is a side elevation of a sad-iron embodying my invention; Fig. 2 is a vertical section on the line X—X of Fig. 3; Fig. 3 is a vertical section on the line Y—Y of Fig. 2; Fig. 4 is a sectional detail of the underside of the movable switch block or member; Fig. 5 is a detail of one of the contact jaws of the switch box; Fig. 6 is an enlarged sectional detail of the heating element on the line W—W of Fig. 7; Fig. 7 is a perspective view of the heating element; Fig. 8 is a similar view showing the heating element completed by the addition of the contact column; Fig. 9 is a view of the underside of the heating element; Fig. 10 is like unto Fig. 9, showing a modified form of the conductor or winding; Fig. 11 is a perspective view of a griddle embodying my invention; Fig. 12 is a plan view of the heating element used therein; Fig. 13 is a perspective view of a photograph mounter embodying the invention; Fig. 14 is a perspective view of my novel toaster; Fig. 15 is a perspective view of the heating element of the toaster; Fig. 16 is a sectional view of a novel plug adapted to be inserted in an ordinary electric lamp socket and constituting a cigar lighter, or by slight modification a branding tool; Fig. 17 is a top view of the cigar lighter heating element; Fig. 18 represents a circular griddle or electric stove; Figs. 19 and 20 illustrate modifications wherein the stoves are combined with cooking utensils; and Fig. 21 is a detail showing the manner of forming a circular heating element.

One of the objects of my invention, as before stated, is to provide an electric heater or heater element which shall be complete in itself; and, a special object of the invention is to provide a heating element in such form that it may be applied to plane surfaces or plates of all kinds and shapes.

Practically all electrically heated devices hitherto produced may be divided into two classes: those in which the heat is applied and used from one side or one plane surface only, and those in which the heat is applied to and used more or less from all sides. My invention relates more particularly to the former class, including sad-irons of all kinds, nearly all cooking utensils, disk heaters or stoves and cigar lighters. Two constructions have been formerly used in this class. First, that of the enamel process, in which the conductor is enameled to the surface to be heated, in which case the leads or ends of the conductor have to be connected to a second member to obtain terminals. The second system, may be termed the "loose construction system," in which the conductor or heat generator is laid loosely against the surface to be heated, and its terminals are led to a third member which forms the basis of contact for the connecting plug or switch, as the case may be. An objection common to both of these systems is the use of the third member required to support the terminals of the electric conductor or heat generator and to connect the same to a plug or switch. The objection to the enamel system is, that the heat generator cannot be renewed or changed without replacing also the metal body, whereon the enamel is baked. This latter is the expensive part since it requires considerable work to get it in the condition required, therefore, renewals of enameled irons are expensive. It has been necessary also in order to get the heat generator in one plane on such an enameled surface, to wind this conductor to such an excessively high temperature that when it is accidentally exposed to the air it melts almost instantly. Such windings are therefore usually destroyed in case of accident to the iron containing them. The objection to the loose system, in addition to those named above, is mainly that of very low efficiency and also, short life. These factors are closely related, due to the fact that heretofore it has been difficult to secure the winding in one plane, thus enabling the heat to escape readily.

My purpose is to overcome all of these difficulties and provide a heater which shall be complete in itself. By being complete in itself, I mean that the member supporting the conductor in the proper plane for correct heat distribution to the part heated and the contacts or terminals on which the plugs or switch works, shall be, practically, integral parts of the heater element. Also, that the heat generating element shall be applied only on one surface or side of the heater member. The essential feature of the invention then may be stated as being a body, of suitable non-conducting material having one plane surface, on which plane surface is distributed, in one layer, a conductor of elecricity adapted to generate heat on passage of the proper current, and two contacts suitably fastened to the same body at any point, to which are connected the terminals of this conductor, said contacts being adapted for coöperation with a switch or a plug, or for use as binding posts for a cord. Such a heater may be applied to any plane surfaced metal body and it is evident that the heat generated by it will pass directly into such body. It is also evident that it may take many forms; also that the conductor may be distributed on its surface in many ways; also the cross section or shape of the conductor may be varied to suit different purposes.

For most purposes I prefer the distribution of the heat conductor in the form of a volute spiral, starting from the center and progressing outward, the turns of this spiral being separated by insulating material, as in Figs. 9, 12, 17 and 21. It is also possible to make a winding in the form of a reflex or zig-zag, as in Figs. 10, 14 and 15.

I cause the conductor to adhere to the body of the heater by means of different insulating compositions. In most forms I prefer the use of adhesive fire proof cement, which is put on cold and solidifies as it dries, and which possesses expansible characteristics allowing for the expansion and construction of the resistance winding. The composition of the conductor carrying body can also be varied. It can be made of metal and conductors cemented thereto in the manner just referred to. I, however, prefer to use, in forming the carrying body, a composition of hydraulic cement with asbestos and other ingredients which are pressed into form by a hydraulic press, and cement or enamel the conductor upon one side of the body thus formed. The shape of this body may also readily be varied to adapt it to many purposes. It may, for instance, be made triangular, as shown in Figs. 7 to 9, adapting it for use in sad-irons. This body may then have terminals on it, adapting it for use with a plug or switch, as in Figs. 1, 2, 3 and 8, or it may have terminals, adapting the cord to be connected directly, as in Fig. 7.

I prefer that the conductor shall be in the ribbon form shown, as it gives a much greater heating effect, compared with round wire; and enables more energy to be used per square inch than would be possible with a wire. This is highly desirable in the case of sad-irons. My heater may also be made in a circular form, in which form it is adapted for such purposes as are indicated in Figs. 16 to 21. In this case either the ribbon conductor or wire conductor may be used, depending upon the purpose for which the heater is intended and the temperature required. In all cases the heater is complete in itself, as stated above, and the fastening to the disk or vessel is purely mechanical. It may therefore be removed with its connections or contacts by anyone as no change or disturbance of electrical connections is required. This is very convenient in case of renewal or in the case of exchange of heaters, for obtaining different temperatures in the same article. It is also possible in the case of cooking utensils to make a heater in a disk or circular form, as shown in Fig. 21, and this can then be applied by anyone to any cooking vessel, such as a tea kettle, fry pan or stew pan. The same may also be done in the case of the triangular form for sad-irons, thus enabling a person to have but one body or top for the sad-iron and several heaters to be used at different times and temperatures according to the uses of the iron. Figs. 11 and 12 show this heater in a square form. This may have a sheet iron shell put over it as has the circular form in Fig. 21 and may be used for the same purpose as the circular form. Modified as in Fig. 13 it is more specifically intended for mounting photographs. For this purpose it has a thin casing fastened over it and is used inverted for the purpose of mounting photographs by means of tissue which is rendered adhesive by heat.

It will now be evident that my heater element is quite universal in its application and that its form and structure may be varied a great deal without departing from the spirit of the invention.

I might also add that I claim as new, the ribbon or rectangular form of conductor, particularly in sad-irons and cigar lighters; and believe that it is impossible to expend the required amount of energy in limited space and one plane in any other way, without embedding the conductors in enamel, which as explained is objectionable. I have also discovered in this connection that a ribbon or rectangular form of conductor may be used with the old enamel process, thereby overcoming some of its defects; the reason for this being that the ribbon can be wound in such close form that a conductor can be used which does not attain an excessively high temperature and hence, even though the enamel be chipped from it accidentally, it will receive no harm through exposure to the air. It should also be noted that where this heater is applied in its various forms to the different metallic planes or surfaces that there is either placed a coating of non-conducting cement over the surface of the conductors as shown in Figs. 12, 19 and 21, or there is interposed, between the heater and the metallic surface, a sheet of mica, or the like, as in the case of the sad iron, Figs. 1, 2 and 3.

Having now defined the general principles and characteristics of my invention, I will explain in detail the construction of the several preferred embodiments thereof which are disclosed in the drawings.

The drawings show my sad iron in the fullest detail and as practically all of the features of the sad iron appear in other forms of my invention I will describe it in such manner as to point out the salient features and their general application, as well as the minor details that are characteristic of sad-irons.

In Figs. 1, 2 and 3, A, represents the body of the sad-iron, B, the heater element and C the hot plate, or plate to be heated. The handle, D, is supported by the post, $d'$, secured on the body by a tenon and bolt, $d^2$. The body contains a large cavity, $a'$, which is partially filled with insulating material, $a^x$, preferably a light fluffy material, such as magnesia and asbestos. The lower part of the body terminates in a narrow rim, $a^2$, which fits a shoulder, $b'$, provided therefor on the upper edge of the heater element, B. The top of the body contains a deep recess, $a^3$, and the longitudinal groove, $a^4$, the latter having guide shoulders, $a^{4'}$, hereinafter referred to. In the bottom of the recess, $a^3$, is the large hole, $a^5$, and in the bottom of the groove, $a^4$, is a rectangular hole or slot, $a^6$. The walls of both of these openings are tapered, the same being smallest at the top, to serve as guides for other parts when the sad iron is assembled. The rear end of the body is provided with two vertical ribs, $a^7$, which serve to support the iron, when tipped up on end. At such times the iron rests on the ribs, $a^7$, and the end of the handle, D; all of which parts remain comparatively cool, due to the thorough insulation of the body of the iron from the heating element, as hereinafter explained.

As explained, the heating element, B, and the body, A, are interlocked by the engagement of the shoulder, $b'$, and the narrow edge or rim, $a^2$, and this engagement prevents the twisting or turning of one part on the other. The larger portion, $B^a$ of the element B comprises a flat plate, of insulating material. The material preferred is a composition of asbestos, cement, etc., and the part $B^a$, is formed by pressing this material in a mold, the same being subjected to such pressure that the finished article takes on much the same density as marble or tile while possessing far greater tensile strength approaching that of vulcanized fiber rendered practically incompressible to the weight and blows from the body of the iron, without cracking, crushing or breaking. Yet the part, $B^a$, constitutes an exceptionally good insulator, being a very poor conductor of both heat and electricity. The rigidity of the plate or part, $B^a$, prevents it from springing up or down at the center and I therefore rely upon it to press and hold the electrical conductor, about to be described, in proper, close heating contact with relation to the sole or smoothing plate.

My novel composition is in itself an excellent non-conductor of both electricity and heat, but I further perfect the same by enameling or japanning the pieces thereof with high temperature baking japan. The articles made in this manner withstand much higher voltages, as all moisture is excluded and I am able to form, press or mold the material into the shapes required for various electrical appliances and use the japanned articles as substitutes for those which are ordinarily made of porcelain.

In my heater elements I ordinarily confine the enamel or japan to the edges thereof and if desired the backs of the elements or plates may also be japanned. In forming the plate of insulating material, I preferably provide the same with the central recess or opening, $b^2$, and the depression or wide shallow recess, $b^3$, leaving the edges or rims, $b^4$ and $b^5$, as margins therefor. Having formed this groove I place therein the electrical conductor or resistance; relied upon to generate the necessary heat. The resistance, conductor or heat generator, as best shown in Figs. 6 and 9, is in the form of a triangular volute, which substantially fills the groove or recess, $b^3$. The volute is made of ribbon-like wire, $b^6$, and the several turns or windings of this ribbon are separated by insulating cement, $b^7$, wherewith the groove is filled after the windings are placed therein. It may be here explained that sufficient cement is used upon the windings to hold them in shape before the volute is put into the groove, the groove being completely filled afterward. The windings seat against the bottom of the groove and the lower edges of the ribbon are, substantially, in the same plane with the lower edges, $b^4$, $b^5$, of the plate, $B^a$. If desired the cement filling, $b^7$, may be relied upon as a facing for the coil or winding, but in most cases I prefer to add a sheet of mica, $B^c$, to the bottom of the element, B, to prevent direct electrical contact between the heating coil and the plate, C. The cement not only firmly secures the conductor, $b^6$, in the part, $B^a$, but also holds the mica sheet securely enough to prevent its loss when the element, B, is shipped separately from the iron.

It should be observed that my heat generator or conductor is confined to one plane or layer in the under side of the insulating plate, $B^a$, and in direct mechanical engagement or contact with the part to be heated. By forming the heat generator in this manner, i. e., with many turns or windings of flat, vertically positioned, wire or ribbon, I am able to place a great quantity thereof in the small space available in a sad iron, thus securing the advantages of a large heating body and high temperature, without necessitating an excessively high temperature in the conductor and insuring freedom from such overheating of the conductor as would occasion the burning out thereof. In fact my sad irons may be connected in circuit and left in operation indefinitely without overheating.

The arrangement of the conductor adjacent to the edges, point and corners of the hot plate or bottom of the sad iron results in the heating of such parts to a higher degree than the center of the iron, affording obvious advantages in the actual use of the sad iron; it being well known that the radiation of heat is most rapid at the point and edges of a flat iron, due to contact with the damp cloth upon which the iron is used.

Like advantages may be secured with the reflex form of winding, $B^a$, illustrated in Fig. 10, but I prefer the winding shown in Fig. 9, because of better distribution of the heat and the greater ease with which the winding may be formed or manufactured. The heater element, B, has its own electrical terminals and contacts. The terminals proper, $B^z$ and $B^x$, comprise loops of the ribbon wire, passed through holes in the part, $B^a$, and looped or caught upon respective ends of the conductor, $b^6$. These loops may be readily threaded through the openings and properly connected with the ends of the conductor after the latter is put into the recess in the part, $B^a$. Binding screws, $b^{z'}$ and $b^{x'}$, are fastened in the plate, $B^a$, and the nuts, $b^9$, thereof serve to secure the ends of the loops or terminals. The heads, $b^8$, of the screws are covered by or embedded in the cement, $b^7$, and hence are thoroughly insulated and held against possible contact with the plate, C. The fastenings, $b^{z'}$—$b^{x'}$, are of a temporary character as I prefer to also make the contacts or switch terminals permanent or substantially integral parts of the heater element, B. These contacts are upright bars or blades, $b^{10}$, having their lower ends secured upon the binding screws; the terminal loops, $B^z$, $B^x$, being bound between the same and the nuts, $b^9$. A reliable, permanent connection is thus formed between the contacts, $b^{10}$, and respective ends of the conductor. The contact blades, $b^{10}$—$b^{10}$, may be of any desired cross section and are held parallel, at a fixed distance from one another, by means of the contact column or block, $B^w$. This is T shaped and has holes for the reception of the parts, $b^{10}$. In turn, the contact blades serve to hold the block, $B^w$, the lower end of which rests on the top of the plate, $B^a$. The column, $B^w$, extends upward through the hole, $a^6$, in the body of the iron, the upper ends of the contacts being thus positioned within the switch block groove, $a^4$, for engagement with the switch block hereinafter described. The sides of the block, $B^w$, serve to insulate the contact blades, $b^{10}$, from the body of the iron.

The smoothing plate, C, of my sad iron is preferably, though not necessarily, a thin rimless metal plate, having its lower surface properly polished. It carries the central bolt, $c^2$, the upper end of which is threaded to receive the nut, $c^4$. $c^3$, represents an insulating washer. The bolt is preferably cast into, or formed integrally with, the plate, C, and by tightening the nut, $c^4$, the body, A, and the plate, C, are firmly bound or clamped upon the heater element, B. As a means of interlocking the plate with the heater element, to prevent the plate from turning thereon, I provide the plate with a projection which enters the opening, $b^2$, in the member, B. The projection is preferably a triangular portion, $c'$, and the opening, $b^2$, is correspondingly formed. See Figs. 1, 7 and 9. The interlocking projection and the hole may be variously formed, but I find that the form shown may be made with a minimum of labor. I desire that it shall be understood that it is not necessary to place the mica washer or separator upon the heater element. It may be loosely laid on the plate C, where it will be held by the triangular projection on the latter.

I have devised numerous forms or kinds of switch blocks or plugs for my sad iron and desire that it shall be understood that the block may be capable of, and adapted for movement in either vertical or lateral direction, to engage and disengage it from the contacts, $b^{10}$. But for several reasons I find the switch block herein shown to be most acceptable to users of the iron. It comprises a simple rectangular block, F, of suitable insulating material and is adapted to slide in the groove, $a^4$. It is held in the groove by the springs, $e$, which have bent ends, $e^2$, to snap over the end of the block (as in Fig. 3) or into the grooves, $f'$, (as in Fig. 1). In one position the contacts $f^2$, in the block are engaged with the contacts, $b^{10}$, of element, B; in the other position they are disengaged therefrom. The spring, $e$, forms an end stop for the block and rises from the recess, $a^3$. The end of the spring contains a large hole to prevent contact with the post or bolt, $c^2$, and is held firmly by the washer, $c^3$, and the side walls of the recess, $a^3$, the latter preventing turning movement. The spring is bifurcated (see Figs. 2 and 3), and it is desirable to thus hold it in parallelism with the block.

The switch block, F, contains longitudinal holes, $f^3$, $f^3$, and slots, $f^4$, which latter open through the bottom of the block, the slots and holes forming recesses to receive the blades, $b^{10}$. $f^5$, are lateral holes in the block. Each contact, $f^2$, comprises a straight leaf, $f^{2'}$, having a beveled end and a bent or spring leaf, $f^{2''}$, having an outwardly turned end. These parts are fastened together and contain a threaded hole for the binding screw, $f^6$. $g$ represents a flexible cord; $g'$ a rubber protector and $g''$, a flexible coil spring holder fastened to a block by the screw, $g'''$. The insulated wires $g^4$, enter the holes, $f^3$, in the block and are attached to respective contacts, $f^2$, by the set screws, $f^6$. The latter are inserted through holes, $f^5$, and while leaving the contacts free to move laterally in holes, $f^3$, prevent longitudinal movement therein. Thus constructed the contacts form flexible or floating jaws, which are readily engageable with the contact blades, $b^{10}$, when the block, F, is pushed into position beneath the springs, $e$, and against the end stop formed by said spring. The block preferably has a knob, $f^7$, and may be easily moved back and forth by one finger of the hand which grasps the handle, D. Obviously the block may be wholly disengaged from the iron by withdrawing it from the groove, $a^4$, and spring, $e$. It will be observed also that the live contacts, $f^2$, in the block are completely shielded or sheathed by the block and the user is at no time in danger of a shock therefrom.

A distinct advantage of my sad-iron is that the heating element is a wholly independent and separate part of the sad-iron and by removing the nut, $c^4$, the iron may be dismembered and another heating element substituted in a moment's time.

In a sad-iron the smoothing plate is at the bottom, the body portion being superimposed thereon. This is also the case with a photograph mounter of the kind shown in Fig. 13, in which, H, represents the heater element and, I, the hot plate. But in most other devices the plate to be heated is placed at the top of the device and forms the upper surface thereof. This is the case in the griddles and stoves shown in Figs. 11, 12, 18 and 21, wherein, J, represents the heated plate and K the body of insulating material containing the heat generator, whereof, $k$—$k$, are the terminal contacts. L are supports or legs preferably formed of insulating material. The device may, however, have a metal base and legs, $k'$, $k''$, as shown in Figs. 18 and 19. In all of these cases the heater element is formed in substantially the same manner as described in connection with the sad iron, but the volute winding takes different shapes. Either the stoves or the griddle may be provided with a mica heating surface in lieu of the metal plate, J, but I prefer to use both.

I desire that particular notice be taken of the fact that the heat generator is practically in direct mechanical contact with the heated plate or body, being separated therefrom by a very thin sheet of electrical insulation. In consequence practically all of the heat from the generator is transmitted immediately to said plate and the latter will attain its maximum temperature very quickly after the conductor or resistance is connected with the circuit.

The toaster shown in Figs. 14 and 15 comprises a suitable box, M, having a grating, $m'$, in its top and containing a heater element, $B^v$, in its lower part. This heating element is formed in substantially the same way as the element, B, but the resistance or conductor, $b^v$, is preferably arranged in zig zag form, the round or flat wire being partially embedded in the composition backing or plate. The terminals are attached directly to this plate, in position to receive a connecting plug or socket.

My novel cigar lighter, shown in Figs. 16 and 17, preferably comprises a disk, $B^u$, of insulating material containing a groove wherein the spiral or volute conductor, $b^u$ is placed. A small quantity of insulating material, $x$, in the bottom of the groove secures the ribbon therein and leaves the greater portion of the ribbon open for contact with the end of a cigar. The disk, $B^u$, fits in to the end of the plug, O, which resembles the end or plug portion of an incandescent lamp and is adapted to be screwed into an ordinary lamp socket. The electrical connections, $o'$, $o''$, are formed in much the same manner as in an ordinary electric plug and the disk, $B^u$, is separable; to the end that it may be readily replaced by another. It will at once be understood that my cigar lighter may be readily converted into a branding iron by merely adding a die plate over the disk, $B^u$.

Although I have herein differentiated the body, A, of the sad iron from the plate, C, which differentiation is carried out in the description of the other forms of the invention, the portions A and C may be properly considered as constituting the body which in a sense contains the heater element and in certain of the following claims I shall refer to the metal body portions as a single body or inclosure for the heater element.

As various modifications of my invention will readily suggest themselves to one skilled in the art I do not limit the invention to the specific structures herein shown and described.

The circuit closing and breaking device or mechanism disclosed herein forms the subject-matter of and is claimed in my copending divisional application, Serial No. 608,051, and is not specifically claimed herein.

Having thus described my invention, I claim as new and desire to secure by Letters Patent:

1. The improvements herein described comprising an electric heater unit composed of a plate of hard refractory insulating material, but slightly incompressible and possessing comparatively great tensile strength, a ribbon resistance conductor wound in a single layer or single plane and presenting its edge to the surface of said plate and a layer of insulating cement wherein said winding is embedded and by which it is firmly attached upon the face of said plate, said cement being arranged in such manner as to expose substantially the extreme other edge of said conductor.

2. The improvements herein described comprising a heater unit composed of a plate of refractory insulating material having a wide recess in one face, in combination with a ribbon conductor arranged in a single layer or single plane occupying said recess, and a layer of insulating expansible cement filling said recess and separating the turns of said winding, said winding being embedded in but not wholly covered by said cement.

3. The improvements herein described comprising an electric heater unit composed of a plate of refractory insulating material having a shallow, flat-bottomed recess in one face, in combination with a strip of resistance ribbon wound in a single layer or single plane, the thickness of which equals the depth of said recess, a layer of insulating cement filling said recess, attaching said winding to said plate and separating the turns of the winding, the extreme edges of said winding being substantially exposed at the surface of said layer of cement, and a thin sheet of mica applied on said exposed edges to prevent direct contact between the turns of the winding and the member to be heated.

4. The improvements herein described comprising an electric heater unit composed of a plate of insulating refractory material, an upstanding rim on its edge forming a recess in one side of said plate, in combination with a strip conductor equal in width to the height of said rim wound in a single layer or single plane and occupying said recess, a layer of porous insulating cement filling said recess and wherein said winding is embedded with the extreme edges of its turns exposed, and terminals for said winding upon the opposite side of said plate, substantially as described.

5. As an article of manufacture for use in sad irons, a separable heater unit comprising a composite structure consisting of a layer of hard refractory insulating material and a layer of insulating cement, and a single layer winding of ribbon conductor embedded in a layer of cement with its edges exposed, said insulating material, cement and conductor being all consolidated in a rigid substantially integral mass.

6. The improvements herein described, comprising an electric heater unit composed of a backing plate which consists of insulating material, in combination with a single layer or single plane winding of resistance ribbon on one side of said plate, and a layer of self-hardening insulating cement wherein said winding is embedded, insulated from and attached to said plate, and a terminal column for said winding upon the opposite side of said plate, substantially as described.

7. The improvements herein described, comprising an electric heater composed of a thin, flat backing plate of relatively hard insulating material having a wide, shallow flat bottomed depression in one side, a resistance ribbon wound in a plurality of turns and in a single plane and collectively laid in said depression, binding posts upon said plate for the ends of said ribbon, and a layer of self-hardening cement insulating the many turns of and securing said winding in said depression.

8. The improvements herein described, comprising an electric heater unit composed of a thin flat plate of hard refractory insulating material, but slightly compressible and possessing comparatively great tensile strength, in combination with a single layer or single plane ribbon-like resistance winding substantially buried in cement and attached thereby to one face of said plate, terminals for said winding upon the opposite face of said plate, and suitably insulated contact blades extending perpendicularly from said terminals and plate.

9. The improvements herein described, comprising an electric heater unit composed of a plate of hard refractory material, having a recess in one side, in combination with a single layer or single plane resistance winding, a layer of insulating, relatively softer cement filling said recess and wherein said winding is embedded, but not wholly covered, binding posts on the opposite side of said plate whereto the winding is connected, and contact blades held by respective binding posts.

10. The improvements herein described comprising an electric heater unit composed of a flat, polygonal plate of substantially incompressible refractory insulating material, in combination with a single layer or single plane resistance ribbon winding upon one side of said plate, a layer of insulating cement wherein said winding is embedded and by which it is pasted to the side of said plate, the edges of said winding being substantially exposed at the surface of said layer of insulating cement, and contact blades secured to and projecting perpendicularly from the back of the plate and whereto the ends of said winding are connected.

11. The improvements herein described, comprising an electric heater unit composed of a plate of substantially incompressible refractory insulating material, in combination with a single layer or single plane resistance winding upon one side of said plate, a layer of insulating cement wherein said winding is embedded and by which it is pasted to the side of said plate, said winding being substantially exposed at the surface of said layer of cement, a thin sheet of mica applied to the side of the plate containing the winding, winding terminals upon the opposite side of said plate, contact blades projecting therefrom, and a column of insulating material holding said blades.

12. The improvements herein described comprising an electric heater unit composed of a thin plate of refractory insulating material, having a recess in one face, in combination with a single layer or single plane resistance ribbon winding, and a layer of insulating cement filling said recess to a point flush with said face, and wherein said winding is embedded, the edge of said winding being substantially exposed at the surface of said layer of cement, a thin sheet of mica applied to the edge of the ribbon winding to prevent direct contact between the winding and the member to be heated, terminals upon the opposite side of said plate, contact blades projecting therefrom, and a column of substantially incompressible refractory insulating material holding said blades.

13. The improvements herein described comprising an electric heater unit composed of a thin, flat plate having a wide, shallow recess in one side, in combination with a single plane or single layer winding of resistance ribbon in said groove, binding posts extending through the other side of said plate for the ends of said ribbon, contact blades secured to the plate by respective posts, and a layer of non-conducting, self-hardening paste wherein said winding is embedded in said recess and whereby it is firmly attached to said plate.

14. The improvements herein described, comprising an electric heater element composed of a thin plate of refractory insulating material, in combination with a resistance winding, means attaching the same in said plate, terminals for said winding upon one side of said plate, an insulating column rising therefrom, and contact blades attached to said terminals held by said column and rising above said column.

15. The improvements herein described, comprising an electric heater unit composed of a thin, flat plate of refractory insulating material having a recess in one side, a single plane resistance winding arranged in said recess, means insulating the turns of the winding and securing the same to said plate, binding posts arranged in said plate and projecting from the back thereof, the ends of said winding being connected with respective posts, contact blades having their ends secured upon respective posts, and an insulating block or column through which said blades extend and by which the same are held parallel.

16. The improvements herein described, comprising an electric heater unit composed of a plate of refractory insulating material in combination with a resistance winding thereon, binding posts or screws provided in said plate and projecting from the side thereof, the ends of said winding being connected with respective posts, contact blades, a block or column of insulating material, wherein said blades are held parallel, said blades projecting upward from one end of said column and the other end provided with feet which are secured upon respective binding posts, said column and blades being removable from said plate as one piece, substantially as described.

17. The improvements herein described comprising an electric heater element composed of a plate of refractory insulating material, in combination with a single plane resistance winding attached to one side of and carried by said plate, terminals upon the opposite sides of the plate whereto said winding is connected, a T-shaped insulating block arranged between said terminals and having parallel openings in its T portion, contact plates arranged in said openings and secured to said plate in electrical connection with respective terminals.

18. The improvements herein described comprising an electric heater composed of a flat plate of refractory insulating material shouldered to fit a holding member and having a polygonal interlocking recess or hole to receive a similarly shaped interlock of a plate to be heated, in combination with a resistance winding embedded in said plate, close to the surface thereof and a thin sheet of material which is a poor conductor of electricity, and a good conductor of heat covering said surface to prevent contact with the plate to be heated.

19. The improvements herein described comprising a heater unit for sad-irons composed of a thin, substantially triangular flat plate of refractory insulating material having a polygonal interlocking opening in its central portion, a flat ribbon resistance winding presenting its edge to and bodily cemented edgewise on one side of said plate, and terminals upon the opposite side thereof.

20. The improvements herein described comprising a thin, substantially triangular flat plate of refractory insulating material having a recess in its underside, a single plane winding of resistance ribbon arranged in said recess, a layer of insulating, self-hardening cement wherein said winding is embedded in said recess, so as to be substantially flush with the surface of said plate, terminals upon the top of said plate and connected with respective ends of said winding, said plate being formed to interlock with the body and ironing plate portions of the sad iron.

21. As an article of manufacture, a heating element for a sad iron in the form of a unitary structure adapted to be removably mounted in the body of the iron, and comprising a hard, substantially triangular flat plate, in combination with a substantially triangular volute winding of resistance ribbon arranged in a single plane or layer, upon the side of said plate, and a layer of relatively softer insulating self-hardening paste wherein said winding is embedded and attached to said side of the plate, substantially as described.

22. As an article of manufacture comprising a thin, flat plate of refractory insulating material having a wide, flat bottomed recess in its side, in combination with a single layer volute ribbon resistance winding occupying said recess, binding screws extending through said plate into said recess and projecting from the opposite side thereof, winding terminals projecting through said plate and connected with said binding screws, and a layer of cement filling said recess and embedding said winding, binding screws and terminals, substantially as described.

23. The improvements herein described comprising a metallic body portion containing a cavity, a unitary heater element interlocked with said body portion and closing the cavity therein, said heater element comprising a thin plate of refractory insulating material, and a single plane resistance winding embedded on one side of said plate with its edges exposed, a heat receiving and transmitting plate interlocked with said heater element, and a central clamping post extending from the hot plate through to said element and body portion and secured upon the latter.

24. The improvements herein described, comprising a body portion, in combination with an electric heater element composed of a plate of refractory insulating material, a single layer resistance winding on one side thereof, binding posts fixed upon the opposite side of the plate and connected with said winding, a column of insulating material extending from the plate, and contact blades arranged in said column and connected with said posts, a switch member having complementary contacts and movable into and out of engagement with said blades, a hot plate, and means for clamping said heater element between said hot plate and said body.

25. In an electric sad iron, a body portion containing a vertical hole and a cavity, in combination with a heater element comprising a plate carrying a resistance winding inclosing said cavity, a column of insulating material extending from said plate through said vertical hole, contact blades in said column and forming the terminals of said winding, a hot plate, means clamping said heater element between said hot plate and body, and a switch block movable on said body and containing contacts for engagement with said blades.

26. In an electric sad iron, a body portion containing a vertical hole and a cavity, in combination with a heater comprising a plate carrying resistance winding and closing said cavity, a column of insulating material extending from said plate through said hole, contact blades in said column and forming the terminals of said winding, a bottom plate, means clamping said heater element between said bottom plate and body, a switch block movable on said body and containing contacts for engagement with said blades, and a filling of heat insulating material in said cavity.

27. An electric sad iron comprising a body portion having a recess in its underside, in combination with a substantially triangular flat plate of refractory insulating material suitably interlocked with the lower edge of said body, a single layer resistance winding upon the lower side of said plate, contact members connected therewith and rising from the top of said plate, a bottom plate suitably interlocked with said flat plate, means clamping said body and said bottom plate upon the flat plate, said recess in the body being substantially filled with material which is a poor conductor of heat, and a contact block or plug having contacts and movable into and out of engagement with the said members, substantially as described.

28. An electric sad iron comprising a body portion having a recess in its underside, in combination with a substantially triangular flat plate of refractory insulating material suitably interlocked with the lower edge of said body, a single layer resistance winding upon the lower side of said plate, contact members connected therewith and fixed upon the top of said plate and extending through the top of said body, a bottom plate suitably interlocked with said flat plate, a post extending from the bottom plate through said flat plate and body, a nut thereon for clamping said body and said bottom plate upon the flat plate, said recess in the body being substantially filled with material which is a poor conductor of heat, and a contact block or plug movable upon the body and having contacts for engagement with the said members.

29. In an electric sad iron the combination with a bottom element, of an independent readily separable heater unit resting thereon, and containing a heating conductor in heating relation to said bottom element, and a top element resting on and completely separated from said bottom element by said heater unit, said top element having a recessed underside into the lower portion of which the upper portion of the heater unit enters and is thereby engaged with the top element, the remaining portion of the recess being filled with heat insulating material.

In testimony whereof, I have hereunto set my hand, this 10 day of Sep., 1908, in the presence of two subscribing witnesses.

CHAS. P. MADSEN.

Witnesses:
CHARLES GILBERT HAWLEY,
M. SIMON.